(12) United States Patent
Tanigawa et al.

(10) Patent No.: US 7,840,107 B2
(45) Date of Patent: Nov. 23, 2010

(54) OPTICAL PUMPING DEVICE, OPTICAL AMPLIFIER, FIBER LASER, AND MULTICORE FIBER FOR OPTICAL PUMPING DEVICE

(75) Inventors: Shoji Tanigawa, Sakura (JP); Hironori Tanaka, Sakura (JP); Manabu Saito, Sakura (JP); Tetsuya Sakai, Sakura (JP); Tomoharu Kitabayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 626 days.

(21) Appl. No.: 11/696,620

(22) Filed: Apr. 4, 2007

(65) Prior Publication Data

US 2008/0018989 A1    Jan. 24, 2008

(30) Foreign Application Priority Data

Apr. 5, 2006    (JP)    ............................. 2006-104056

(51) Int. Cl.
  *G02B 6/26*    (2006.01)
  *G02B 6/287*    (2006.01)
  *H04B 10/17*    (2006.01)

(52) U.S. Cl. ..................... 385/43; 359/341.32; 359/349

(58) Field of Classification Search ............ 359/341.32, 359/349; 385/43
See application file for complete search history.

(56) References Cited

U.S. PATENT DOCUMENTS

| | | | |
|---|---|---|---|
| 5,864,644 A * | 1/1999 | DiGiovanni et al. | ........... 385/43 |
| 7,046,432 B2 * | 5/2006 | Starodoumov | ......... 359/341.32 |
| 7,107,795 B2 * | 9/2006 | Cheo | ........................... 65/390 |
| 2005/0238301 A1* | 10/2005 | Russell et al. | ................ 385/113 |
| 2006/0010920 A1* | 1/2006 | Cheo | ........................... 65/390 |
| 2006/0187541 A1* | 8/2006 | Starodoumov | ......... 359/341.32 |

FOREIGN PATENT DOCUMENTS

| | | |
|---|---|---|
| JP | 2001-068766 A | 3/2001 |
| JP | 3353755 B2 | 9/2002 |
| JP | 3415449 B2 | 4/2003 |

* cited by examiner

*Primary Examiner*—Eric Bolda
(74) *Attorney, Agent, or Firm*—Sughrue Mion, PLLC

(57) ABSTRACT

An optical pumping device is provided in which a multi-core fiber obtained by bundling up a plurality of optical fibers, which are input ports, and a double clad fiber for optical pumping are spliced through a bridge fiber composed of a double clad fiber having a tapered shape. Accordingly, it is possible to efficiently couple signal light and pumping light to the double clad fiber for optical pumping.

17 Claims, 6 Drawing Sheets

PRIOR ART

OPTICAL PUMPING DEVICE, OPTICAL AMPLIFIER, FIBER LASER, AND MULTICORE FIBER FOR OPTICAL PUMPING DEVICE

BACKGROUND OF THE INVENTION

1. Technical Field

The present invention relates to an optical amplification technology, and more particularly, to a technology of coupling signal light and pumping light in order to amplify the signal light, an optical pumping device having an efficient structure for coupling the signal light and the pumping light, an optical amplifier, a fiber laser using the optical pumping device, and a multi-core fiber for an optical pumping device which is a component of the optical pumping device.

The present invention contains subject matter related to Japanese Patent Application JP 2006-104056 filed in the Japanese Patent Office on Apr. 5, 2006, the entire contents of which are incorporated herein by reference.

2. Related Art

Conventionally, as a structure for splicing an optical fiber for transmitting signal light and a plurality of optical fibers for transmitting pumping light to one end (an input side) of an optical fiber for optical pumping, for example, devices disclosed in Patent Documents 1 and 2 were suggested.

FIG. 2 is a view showing an optical fiber device disclosed in Document 1 (Japanese Patent Publication No. 3415449). In an optical fiber device 1, a plurality of multi-mode fibers (hereinafter, referred to as MMFs) 2 for coupling pumping light are bundled up, a cross sectional area reduction section 5, in which the cross sectional area is reduced to the cross sectional region of a clad pumping fiber 4, is formed at the side of the output side of a fiber bundle 3, and the output side of the cross sectional area reduction section 5 and one end of the clad pumping fiber 4 are spliced in a splicing point 6.

FIGS. 3A and 3B are views showing an optical fiber device disclosed in Patent Document 2 (Japanese Patent Publication No. 3353755). In an amplification device 10A shown in FIG. 3A, the output sides of an optical fiber 11 for transmitting signal light and a output side of a plurality of optical fibers 12 for transmitting pumping light are inserted into and held on to a first ferrule 13, one end of an amplification optical fiber 14 is inserted into and held on to a second ferrule 15, and the output side face of the first ferrule 13 and the output side face of the second ferrule 15 are coupled with a graded index lens 16 interposed therebetween. In addition, in an amplification device 10B shown in FIG. 3B, the output side face of the first ferrule 13 and the output side face of the second ferrule 15 are abutting each other.

However, the above conventional technologies have the following problems. In the conventional technology disclosed in Patent Document 1, in a process of bundling up the plurality of MMFs to reduce the cross sectional area, a surface tension for filling gaps among the MMFs is exerted such that the cross-sectional shape of the MMFs positioned at an outermost circumference is apt to be deformed from circle cross-sectional shape. In addition, due to the deformation of the MMFs, coupling efficiency of pumping light with the clad pumping fiber deteriorates. In association with this problem, as the number of pumping ports increases, a deformation ratio of the cross-sectional shape increases and the coupling efficiency deteriorates. Accordingly, expandability is inferior and it is difficult to cope with the request for higher-power pumping.

The deformation of the MMFs occurs by the surface tension for filling the gaps as described above.

In general, when the fibers are only bundled up, a close-packed structure is formed (here, an example of bundling up one signal port fiber 48 located at the center thereof and six MMFs at the periphery thereof will be described), as shown in FIG. 5. The fibers are unified by flame fusion and the diameter thereof is reduced by elongation. However, at this time, since glass is soften, surface tension, that is, the force for filling the gaps is exerted. As a result, the cross-sectional shape of the unified portion is closer to a circle, compared with the original shape. As a result of this deformation, the shape of a light guide section of each MMF is distorted (FIG. 6 is a pattern diagram showing an example of the cross section).

In theory, when the diameter of the light guide section is reduced, a relationship between the diameter $D_{in}$ and the numerical aperture $NA_{in}$ of an input side and the diameter $D_{out}$ and the numerical aperture $NA_{out}$ of an output side has a relationship expressed by Equation A.

$$D_{in} \times NA_{in} = D_{out} \times NA_{out} \qquad \text{Equation A}$$

When the cross-sectional shape after elongation is distorted like this example, $D_{out}$ of Equation A becomes a shortest diameter, that is, a shorter diameter, if the cross-sectional shape is an ellipse (example), and $NA_{out}$ of the emitted light increases.

As a result, when the numerical aperture NA of a rare earth-doped optical fiber connected to the output side of the device is fixed, the numerical aperture NA of the output side of the device exceeds the NA of connected rare earth-doped fiber and, as a result, splicing loss between the rare earth-doped optical fiber and the device significantly increases.

In consideration of the above-described deformation, the fiber bundle preferably needs to have a close-packed structure in order to reduce gaps between the fibers. In other words, the deformation is large except for a case where 7 or 19 fibers are bundled up as shown in FIG. 5 or 7, that is, the close-packed structure, hence there are practical problems. Even when 19 fibers are bundled up, which is close-packed structure, the deformation of the fiber is generally large. As a result, when the number of fibers is more than or equal to 19, a difficulty in use or manufacture usually occurs even when it is a close-packed structure.

Due to the deformation problem, the structure cannot be applied when at least 37 fibers are bundled up even in the close-packed structure and the number of ports is insufficient to obtain a large output power.

Even when only 10 pumping port fibers (MMFs) 49 are required, 18 pumping port fibers (MMFs) 49 and one signal port fiber 48 are required due to restriction of such close-packed structure. That causes redundant increase of $D_{in}$ of Equation A and, as a result, $D_{out}$ or $NA_{out}$ is restricted. Therefore, problems may be caused in splicing with the rare earth-doped fiber at the output side.

In the conventional technology disclosed in Patent Document 2, since spatial propagation is included in the coupling portion between the lens system and the optical fiber, polish treatment and a film for preventing reflection need to be provided on the end of the optical fiber, both ends of the lens, and the end of the optical fiber for amplification. Accordingly, manufacturing cost increases. In addition, when contamination or dust exists on any of the end faces, the light is absorbed by the contamination or dust. As a result, if high-power light is inputted, a failure may occur due to heat generation by the absorption. Since the fiber bundle and the optical fiber for amplification are not directly spliced, long-term mechanical reliability is inferior and a failure is concerned. The mechanical failure of this air-path portion has significant influences on the characteristics of the system. In addition, since the mechanical failure must be necessarily avoided in view of safety, higher reliability is necessary.

The present invention is contrived to solve the above-described problems. An object of the present invention is to provide an optical pumping device for efficiently coupling signal light and pumping light to a double clad fiber for optical pumping.

SUMMARY OF THE INVENTION

In order to accomplish the above-mentioned object, the present invention provides an optical pumping device, wherein a multi-core fiber obtained by bundling up a plurality of optical fibers, which are input ports, and a double clad fiber for optical pumping are spliced through a bridge fiber composed of a double clad fiber having a longitudinal tapered shape.

In the optical pumping device according to the present invention, the multi-core fiber may be formed by inserting the plurality of optical fibers into an alignment member for aligning the optical fibers and contracting gaps therebetween, and the output side of the multi-core fiber may be spliced to one end of the bridge fiber.

In the optical pumping device according to the present invention, the alignment member may be a multi-hole capillary having a plurality of holes.

In the optical pumping device according to the present invention, the multi-hole capillary may be made of silica glass.

In the optical pumping device according to the present invention, a product of a numerical aperture NA and an outer diameter of the multi-core fiber may be less than that of a numerical aperture NA and an outer diameter of the double clad fiber for optical pumping.

In the optical pumping device according to the present invention, the numerical aperture NA of the multi-core fiber may be 0.23 or less, or more preferably 0.15 or less.

In the optical pumping device according to the present invention, the outer diameter of the multi-core fiber may be 1.2 mm or less, or more preferably 750 µm or less.

In the optical pumping device according to the present invention, the numerical aperture NA of an output side of the pumping device may be 0.46 or less, or more preferably 0.43 or less.

In the optical pumping device according to the present invention, the outer diameter of an output side of the pumping device may be 400 µm or less.

In the optical pumping device according to the present invention, the number of holes of the multi-hole capillary may be at least 8 and the holes of the multi-hole capillary may not be arranged in a close-packed structure.

In the optical pumping device according to the present invention, all splicing points are fusion spliced.

According to another aspect of the present invention, there is provided an optical amplifier including the optical pumping device of the present invention described hereinbefore and a pumping light source coupled to the input ports of the optical pumping device.

According to another aspect of the present invention, there is provided a fiber laser including the optical pumping device of the present invention described hereinbefore and a pumping light source coupled to the input ports of the optical pumping device.

According to another aspect of the present invention, there is provided a multi-core fiber for an optical pumping device obtained by inserting a plurality of optical fibers, which are input ports, into a multi-hole capillary and are unified by a heat treatment.

In the multi-core fiber according to the present invention, the number of holes of the multi-hole capillary may be at least 8 and the holes of the multi-hole capillary may not be arranged in a close-packed structure.

In the multi-core fiber according to the present invention, the multi-hole capillary is made of silica glass.

In the optical pumping device according to the present invention, since the multi-core fiber obtained by bundling up the plurality of optical fibers, which are the input ports, and the double clad fiber for optical pumping are spliced through the bridge fiber composed of the double clad fiber having the longitudinally tapered shape, the three-dimensional alignment of the optical fibers becomes easy and the splicing between the fibers can be realized without deforming the input ports. Accordingly, it is possible to efficiently couple signal light and pumping light to the double clad fiber for optical pumping.

Since the splicing between the fibers can be realized without deforming the plurality of input ports, it is possible to easily increase the number of input ports.

Since all light paths are physically combined, long-term mechanical reliability is excellent and a variation in optical characteristics with time decreases. Accordingly, stable optical pumping characteristics are obtained for a long time.

Furthermore, by optimizing the profile of the bridge fiber, the flexibility for design increases.

By using the above-mentioned structure, it is possible to achieve the following optical pumping devices, which cannot be achieved or were hardly achieved in the conventional structure.

(1) An optical pumping device which is capable of decreasing the deformation of pumping light, suppressing the increase of the numerical aperture NA, and efficiently guiding pumping light to rare earth-doped fiber.

(2) An optical pumping device which can be used in a large output power having at least 19 pumping input ports.

(3) An optical pumping device which does not have a close-packed structure, includes, for example, 9, 10, or 12 pumping ports, having a diameter of an input side smaller than that of the conventional structure, and efficiently guides pumping light to the rare earth-doped fiber.

DESCRIPTION OF THE PREFERRED EMBODIMENTS

Figure 1:
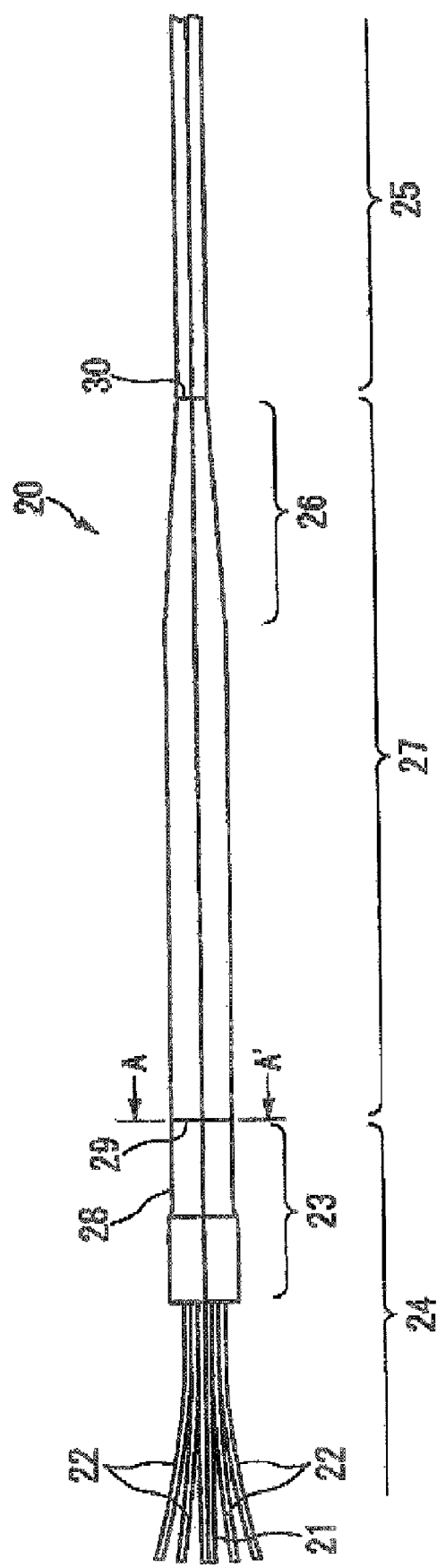
FIG. 1A is a side view showing an optical pumping device according to an embodiment of the present invention.
FIG. 1B is a cross-sectional view taken along line A-A' of the optical pumping device shown in FIG. 1A.
Figure 2:
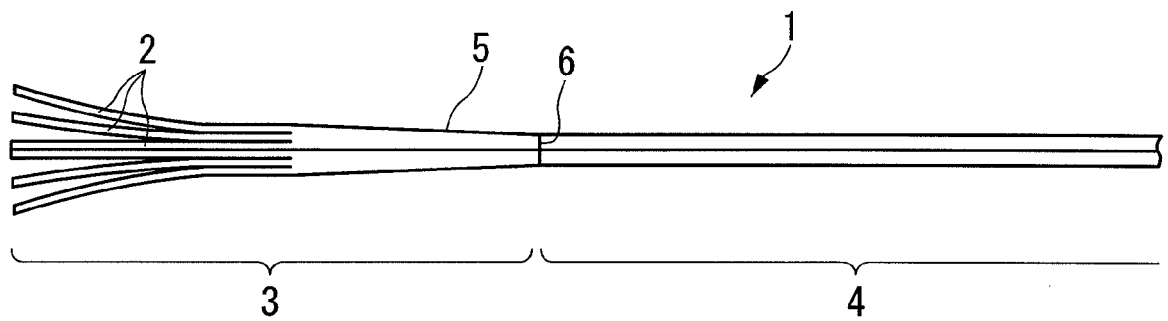
FIG. 2 is a side view showing an example of a conventional device.
Figure 3A:
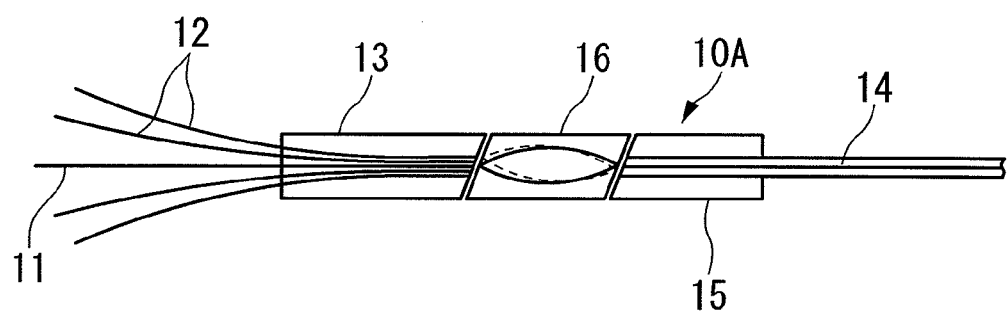
FIG. 3A is a side view showing another example of the conventional device.
Figure 3B:
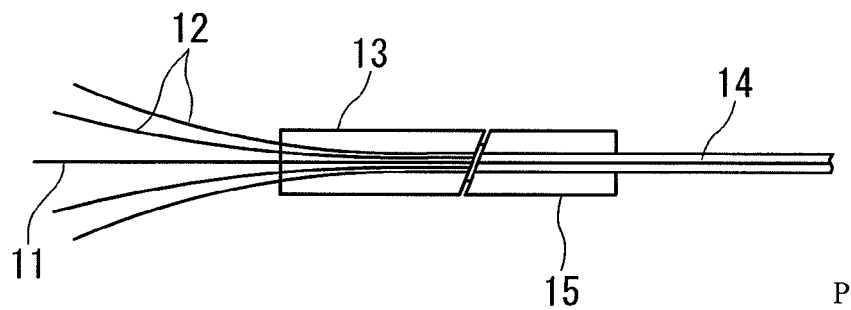
FIG. 3B is a side view showing another example of the conventional device.

Hereinafter, preferred embodiments of the invention will be described with reference to the accompanying figures.

FIGS. 1A and 1B show an optical pumping device according to an exemplary embodiment of the present invention, wherein FIG. 1A is a side view of the optical pumping device 20 and FIG. 1B is a cross-sectional view taken along line A-A' of FIG. 1A. The optical pumping device 20 according to this embodiment is configured by splicing a multi-core fiber 24 formed by inserting a signal port 21 which is the output side of an optical fiber for signal light, and a plurality of pumping ports 22 which is the output side of an optical fiber for pumping light, into a multi-hole capillary 23 as input ports and contracting gaps; and a double clad fiber 25 having a rare earth-doped optical fiber for optical pumping through a bridge fiber 27 composed of a double clad fiber having a tapered section 26.

The multi-core fiber 24 has a structure in which the signal port 21 and the plurality of pumping ports 22 are inserted into the multi-hole capillary 23 made of silica glass having a plurality of holes such that the input ports (the signal port 21 and the plurality of pumping ports 22) are aligned in three dimensions, and a portion thereof is heated to contract the gaps such that a unified contraction section 28 is formed.

In FIG. 1B, 19 holes for inserting the input ports are densely formed in the multi-hole capillary 23 having a cylindrical shape. The signal port 21 is inserted into a central hole of the multi-hole capillary 23, and a total of 18 pumping ports 22 including six pumping ports of a first layer and 12 pumping ports of a second layer are inserted into the holes located at the periphery thereof. Accordingly, the multi-hole capillary 23 and the input ports are integrally formed in the unified section 28. Although not shown, the other ends of the pumping ports 22 are spliced to the output end of a pumping light source such as a laser diode (LD) so as to propagate pumping light having a specific wavelength from the pumping light source to the optical pumping device 20.

The bridge fiber 27 is used to efficiently propagate the light which propagates through the multi-core fiber 24 to the double clad fiber 25 for optical pumping and is, for example, composed of a double clad fiber having the outer diameter equal to that of the front face of the multi-core fiber 24. The tapered section 26 formed in the bridge fiber 27 is formed by heating and elongation, one end of the bridge fiber 27 and gradually reducing the outer diameter of the fiber. The outer diameter of the cross section of the tapered section 26 is preferably equal to that of the double clad fiber 25 spliced thereto.

A splicing point 29 between the multi-core fiber 24 and the bridge fiber 27, a splicing point 30 between the bridge fiber 27 and the double clad fiber 25 are fusion spliced in order to ensure long-term mechanical reliability. Accordingly, antireflection films do not need to be formed on the splicing points, the number of manufacturing processes can be reduced, and a tolerance to high-power light can be improved. In addition, stable optical characteristics with a small temporal variation are obtained. As a heating source used for the fusion of the splicing points 29 and 30, there is arc discharge, $CO_2$ laser or oxyhydrogen flame.

In the optical pumping device 20 according to this embodiment, the pumping light passing through the plurality of pumping ports 22 of the multi-core fiber 24 is input to the double clad fiber 25 through the bridge fiber 27 to excite rare earth element ions doped into the core of the double clad fiber 25. Then, when the signal light is input through the signal port 21, optical pumping occurs in the double clad fiber 25 and amplified signal light is output from the unshown other end (output end) of the double clad fiber 25. The optical pumping device 20 is applicable to an optical amplifier (fiber amplifier) or a fiber laser. In particular, since the pumping light from the plurality of pumping ports 22 can be efficiently input to the double clad fiber 25 for optical pumping, it is possible to provide an optical amplifier of high-power optical amplification or a high-power laser.

Since the optical pumping device 20 according to this embodiment is configured by splicing the multi-core fiber 24 obtained by bundling up the output sides of the input ports (the signal port 21 and the plurality of pumping ports 22) by the multi-hole capillary 23 and the double clad fiber 25 for optical pumping, through the bridge fiber 27 having the tapered section 26, the three-dimensional alignment of the input ports becomes easy and the splicing is accomplished without deforming the input ports. Accordingly, it is possible to efficiently couple the signal light and the pumping light into the double clad fiber 25 for optical pumping.

In this embodiment, in order to easily unify the input ports (the signal port 21 and the plurality of pumping ports 22), the multi-hole capillary 23 is used as an alignment member and the fibers are inserted into the holes which are individually formed in the multi-hole capillary 23 using the multi-hole capillary 23. Thereafter, the vicinity of the end thereof is heated to contract only the gaps that exists between the holes of the multi-hole capillary 23 and the input ports, and to unify them thereby forming the multi-core fiber 24. Accordingly, it is possible to easily align the plurality of optical fibers in three dimensions. Since the input ports are inserted into the holes, a substantially uniform force is exerted upon contraction process. Accordingly, since the splicing can be accomplished without deforming the outer shape of the pumping ports 22, the coupling efficiency of the pumping ports 22 is improved and thus slope efficiency of a fiber amplifier or a fiber laser of the invented pumping device can be improved.

When a structure in which the input ports are unified by employing the multi-hole capillary 23, it is possible to easily cope with the future requirement for an increase in the number of pumping ports by properly setting the number of the fine holes formed in the multi-hole capillary 23 and the arrangement thereof and to suppress the deformation of the pumping ports in the contraction and unification process. In addition, since the profile of the bridge fiber 27, for example, the outer diameter of the clad, the diameter of the core, the length of the tapered section, the outer diameter of the tapered section, a mode field diameter, a relative refractive index difference can be separately optimized, it is possible to relatively easily cope with the requirement for an increase in the number of pumping ports 22.

A ferrule having a single hole capillary having a circular cross section or a hexagonal cross section may be used instead of the multi-hole capillary 23. However, since the surface tension exerted on the ports in the contracting and unifying process substantially becomes uniform by using the multi-hole capillary 23 as described above, it is possible to prevent the deformation of the ports located at the outermost circumference. Accordingly, it is advantageous to use the multi-hole capillary in terms of characteristics.

The material of the multi-hole capillary 23 is preferably silica glass. In general, the optical fiber is made of silica glass. Accordingly, if the capillary made of silica glass is used, a distortion due to a difference in linear expansion coefficient does not occur at the time of the contraction of the gaps or the fusion splicing and thus the mechanical strength does not deteriorate. The diameter of each hole of the multi-hole capillary 23 used when an optical fiber having an outer diameter of 125 μm is used as the input port is preferably in a range of 130 μm to 200 μm. If the diameter is less than 130 μm, it is difficult to insert the optical fiber, and, if the diameter is greater than 200 μm, the gap becomes large and the concentricity error of the central port may increase in contraction process.

Therefore, it is important to have a product of a numerical aperture NA and an outer diameter of the multi-core fiber is less than that of a numerical aperture NA and an outer diameter of the double clad fiber for optical pumping in order to maintain the coupling loss to be minimal.

The other advantages of using the multi-hole capillary are described. In Patent Document 1, the layout of the pumping ports has only the close-packed structure of the pumping port optical fiber. Accordingly, if the number of pumping ports is 6 or less, the pumping light can be efficiently input to the clad pumping fiber. However, if the number of pumping ports is greater than 7, the close-packed structure forces to become the 18-port structure inevitably. As described above, the deformation of the pumping ports is large in the 18-port structure causing the manufacturing process difficult.

Meanwhile, the optical pumping device 20 according to the present invention employing the multi-core fiber using the multi-hole capillary to properly design the multi-hole structure can achieve a pumping structure having any given number of ports. FIGS. 4A to 4E show examples of pumping-port arranged structure of multi-core fibers using multi-hole capillaries each having at least eight holes according to the present invention. In the figure, reference numerals 40A to 40E denote multi-core fibers, 41A to 41E denote multi-hole capillaries, 42 denotes a signal port, 43 denotes a signal port core, 44 denotes a signal port clad, 45 denotes a pumping port, 46 denotes a pumping port core, and 47 denotes a pumping port clad. In the example shown in the figures, a single mode optical fiber is used in the signal port 42 and the MMFs are used in the pumping ports 45.

Figure 4A:
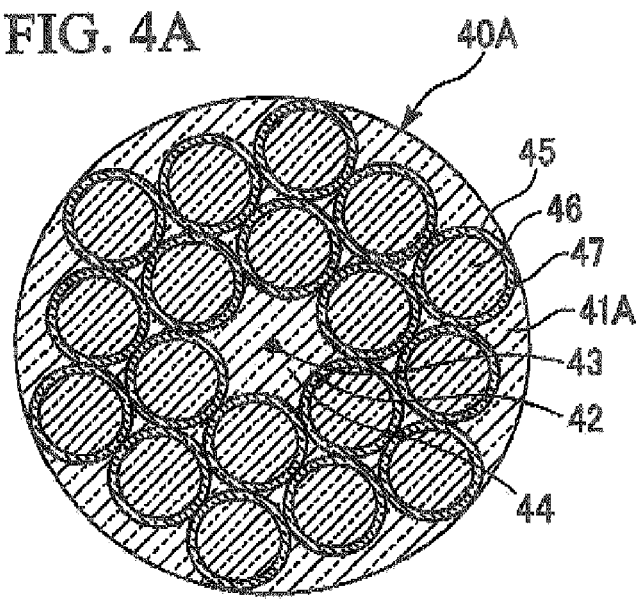
FIG. 4A is a cross-sectional view showing an example of arranging fibers in a multi-core fiber according to the present invention.

The multi-core fiber 40A shown in FIG. 4A has a pumping port arranged structure in which the signal port 42 is inserted into a central hole and the pumping ports 45 are inserted into a total of 18 pumping ports including six holes of a first layer and 12 holes of a second layer and located at the periphery thereof, using the multi-hole capillary 41A having 19 holes and having a close-packed structure.

Figure 4B:
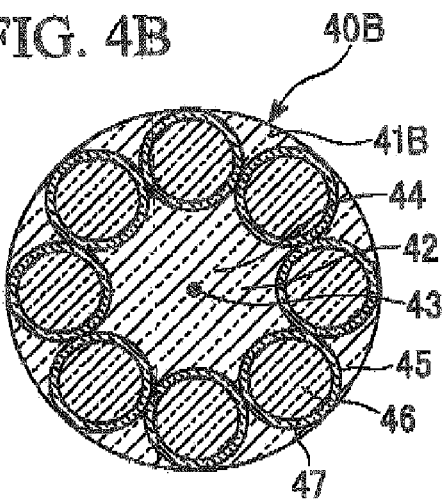
FIG. 4B is a cross-sectional view showing an example of arranging fibers in a multi-core fiber according to the present invention.

The multi-core fiber 40B shown in FIG. 4B has a pumping port arranged structure in which the signal port 42 is inserted into a central hole and the pumping ports 45 are inserted into 8 pumping ports located at the periphery thereof, using the multi-hole capillary 41B having a total of 9 holes including one central hole and eight holes provided slightly spaced apart from the central hole.

Figure 4C:
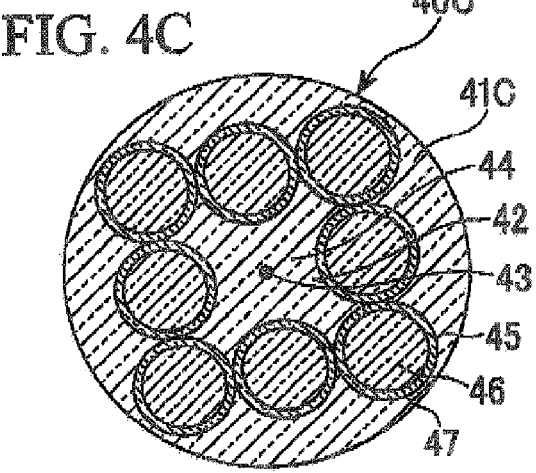
FIG. 4C is a cross-sectional view showing an example of arranging fibers in a multi-core fiber according to the present invention.

The multi-core fiber 40C shown in FIG. 4C has a pumping port arranged structure in which the signal port 42 is inserted into a central hole and the pumping ports 45 are inserted into 8 pumping ports of first and second layers located at the periphery thereof, using the multi-hole capillary 41C having 9 holes including one central hole, four holes of the first layer, which are adjacent to the central hole, and four holes of the second layer, which are slightly spaced apart from the central hole.

Figure 4D:
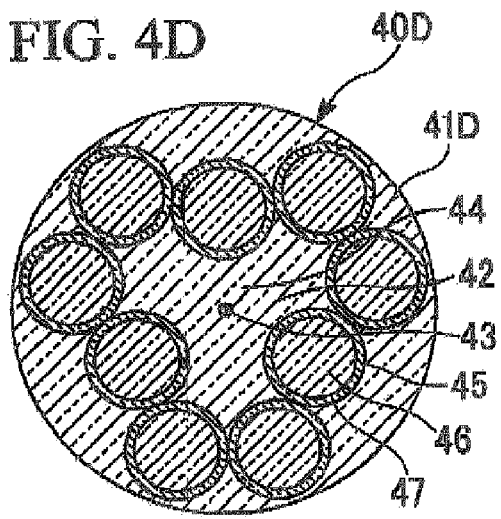
FIG. 4D is a cross-sectional view showing an example of arranging fibers in a multi-core fiber according to the present invention.

The multi-core fiber 40D shown in FIG. 4D has a pumping port arranged structure in which the signal port 42 is inserted into a central hole and the pumping ports 45 are inserted into 9 pumping ports of first and second layers located at the periphery thereof, using the multi-hole capillary 41D having 10 holes including one central hole, three holes of the first layer, which are adjacent to the central hole, and six holes of the second layer, which are provided at the outer circumferences thereof.

Figure 4E:
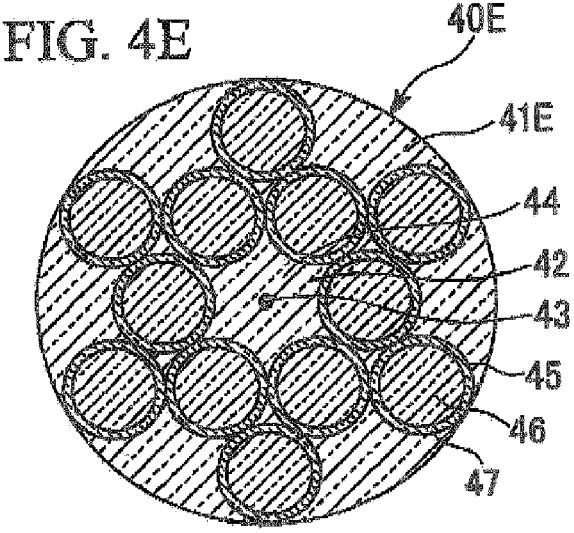
FIG. 4E is a cross-sectional view showing an example of arranging fibers in a multi-core fiber according to the present invention.
Figure 5:
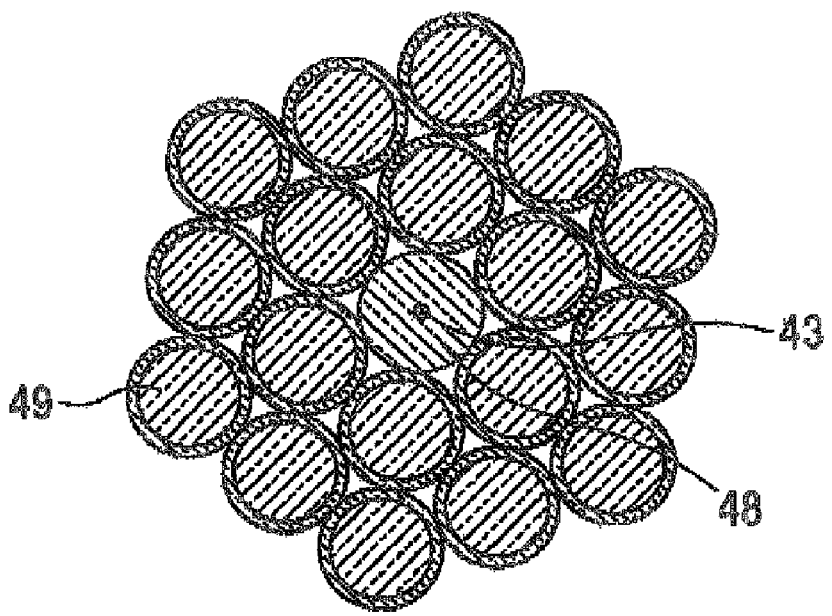
FIG. 5 is a schematic cross-sectional view showing an example of an input side of a multi-core fiber having a conventional structure.
Figure 6:
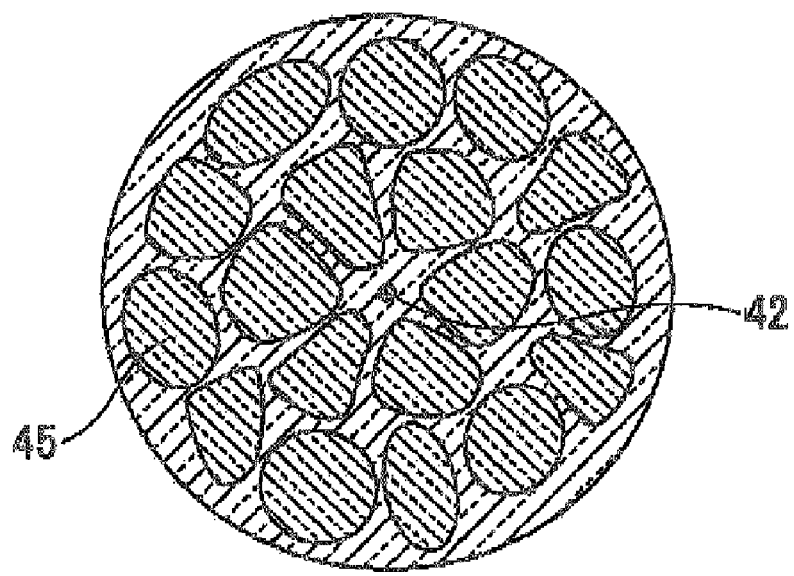
FIG. 6 is a schematic cross-sectional view showing an example of an output side of a multi-core fiber having a conventional structure.
Figure 7:
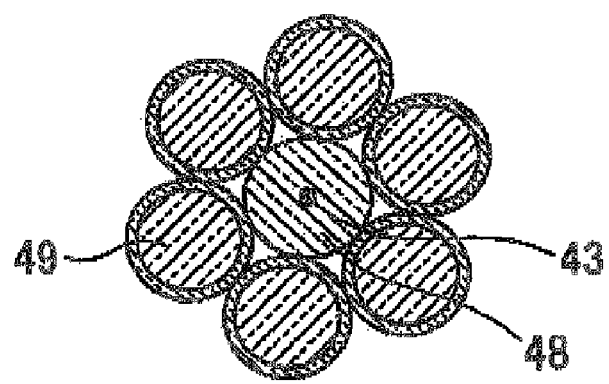
FIG. 7 is a schematic cross-sectional view showing an example of an input side of a multi-core fiber having a conventional structure.

The multi-core fiber 40E shown in FIG. 4E has a pumping port arranged structure in which the signal port 42 is inserted into a central hole and the pumping ports 45 are inserted into 12 pumping ports of first and second layers located at the periphery thereof, using the multi-hole capillary 41E having 13 holes including one central hole, six holes of the first layer, which are adjacent to the central hole, and six holes of the second layer, which are provided at the outer circumferences thereof. Hereinafter, embodiments and the effect of the invention will be described.

Embodiment 1

An optical pumping device having the structure shown in FIG. 1 was manufactured by the following procedure.

At the center of a multi-hole capillary for inserting 19 cores, a single mode optical fiber having a mode field diameter (hereinafter, referred to as MFD) of about 6 μM (at the wavelength of 1.55 μm), an outer diameter of 125 μm, and a relative refractive index difference Δ of 1% was used as an optical fiber for a signal port, and, at the periphery thereof, 18 MMFs having a core diameter of 110 μm and an outer diameter of 125 μM were used as an optical fiber for a pumping port. The outer diameter of the multi-hole capillary was about 1.2 mm and the diameter of the fine hole was 150 μm.

The resin-stripped sections of the optical fibers were inserted into the holes of the multi-hole capillary and were pressed into a flat plate, thereby forming an end face of the fiber. After forming the end face via suction by a vacuum pump, in order to decrease the atmospheric pressure of gaps, the optical fibers were heated, thereby manufacturing a multi-core fiber having an outer diameter of 1125 μm.

A bridge fiber having an MFD of 6 μm and an outer diameter of 725 μm and the multi-core fiber were fusion spliced, and the other side of the bridge fiber was elongated, thereby forming a tapered section. The outer diameter of the output side of the tapered section was 400 μm. Thereafter, the output side of the tapered section and one end of a double clad fiber for optical pumping having an MFD of 20 μm and an outer diameter of 400 μm were fusion spliced.

As for the coupling efficiency of the pumping ports, only the matching of NA was considered, and the signal port was designed such that an MFD was 6 μm at an outer diameter of 725 μm and an MFD was set to be 20 μm when the bridge fiber was elongated to have an outer diameter of 400 μm. Pumping light was input into the pumping ports of the obtained optical pumping device and splicing losses of the splicing points were measured. As a result, it was experimentally verified that the splicing loss between the multi-core fiber and the bridge fiber was 0.6 dB, the splicing loss between the bridge fiber and the double clad fiber was 0.3 dB, and the light from the ports was confirmed to be efficiently input to the double clad fiber for optical pumping with a low loss.

When MMFs having an NA of 0.15 were used, the NA of the output side was 0.30, comparing to the theoretical NA of the output side of 0.27, which was obtained by Equation A, a difference between measured NA and theoretical calculated NA was small.

As it is obvious from the relationship expressed in Equation A, if NA of the input fiber is small, NA of output beam from a device is also small, and the splicing loss between the bridge fiber and the double clad fiber becomes smaller than that of described above (0.6 dB). Therefore the optical fiber in which the NA is smaller than 0.15 can also be used as an input fiber of the device.

Comparative Example 1

Next, a device of Patent Document 1 was manufactured as a comparative example. The same fibers as Embodiment 1 were used as fibers. At this time, in consideration of the matching of an MFD described in Patent Document 1, a reduced diameter was 300 μm. The NA of the output side was 0.38 and was significantly larger than the theoretical NA of the outside of 0.29 obtained by Equation A. As a result, the coupling loss of the pumping light was large, which was 12 dB.

Embodiment 2

An optical pumping device having the structure shown in FIG. 4B was manufactured by the following procedure.

At the center of a multi-hole capillary for inserting 9 fibers, a single mode fiber having an MFD of about 6 μm (at the wavelength of 1.06 μm), an outer diameter of 125 μM, and a relative refractive index difference of 0.45% was used as an optical fiber for a signal port, and, at the periphery thereof, 8 MMFs having a core diameter of 110 μM and an outer diameter of 125 μm were used as a fiber for a pumping port. The outer diameter of the multi-hole capillary was about 440 μm and the diameter of the hole was 135 μm.

The resin-stripped sections of optical fibers were inserted into the holes of the multi-hole capillary, and the fibers and the capillary were fused and unified by flame, thereby manufacturing a multi-core fiber. Thereafter, the unified section was cut to form an end face of fiber.

A bridge fiber having an MFD of about 5 μm (at the wavelength of 1.06 μm) and an outer diameter of 425 μm and the multi-core fiber were fusion spliced, and the bridge fiber was fused and elongated, thereby forming a tapered section. The outer diameter of the output side of the tapered section was 265 μm. Thereafter, the output side of the tapered section and one end of a double clad fiber for optical pumping having an MFD of 20 μm, an inner clad diameter of 300 μm and an outer diameter of 350 μm were fusion spliced, thereby manufacturing the optical pumping device.

At this time, in consideration of the matching with the NA of the inner clad section of the double clad fiber for optical pumping, which was a spliced fiber having the NA of about 0.43, the NA of the output side of the tapered section was set to be less than 0.43 when the outer diameter of the output side of the tapered section was 265 μm in order to increase the coupling loss of the pumping light. In a device manufactured experimentally, the NA of the output side obtained was 0.35. With respect to signal light, the MFD was set to be substantially equal to 20 μm when the outer diameter of the output side of the tapered section was 265 μm to suppress the deterioration of the coupling efficiency due to the mismatch of the MFDs. In a device manufactured experimentally, the MFD of the output side of the tapered section obtained was about 15 μm.

The coupling loss of the pumping light of the obtained device was 0.2 dB in total and the coupling loss of the signal light was 0.8 dB.

Comparative Example 2

For the same purpose as Embodiment 2, the device of Comparative Example 1 may be used. In the structure of Patent Document 1, for example, even in a case where only 8 pumping ports can be used, an 18-port structure needs to be manufactured due to the limitation that the close-packed structure is required. As a result, the outer diameter of the bundle of the input side increases (about 650 μm). Accordingly, if the device is spliced to the same double clad fiber for optical pumping, the diameter reduction ratio of the tapered section of the device needs to be increased.

Thus, the $NA_{out}$ of the manufactured device was about 0.60 and the coupling loss of pumping light was as large as 4.8 dB.

Embodiment 3

Figure 8:
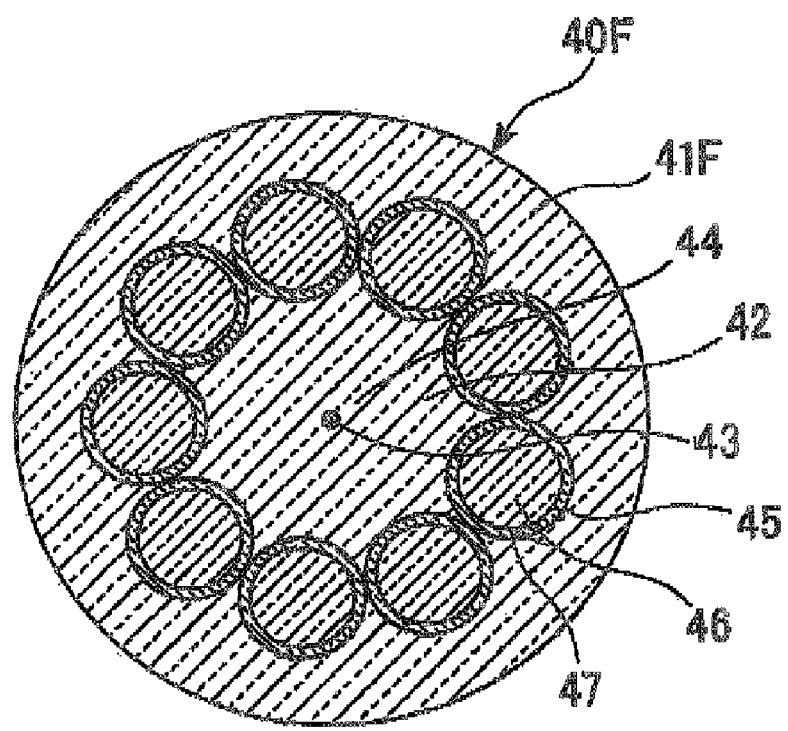
FIG. 8 is a cross-sectional view showing an example of arranging fibers in a multi-core fiber according to the present invention.

An optical pumping device having the structure shown in FIG. 8 was manufactured by the following procedure. The structure of FIG. 8 is equal to the structure of FIG. 4B, except that the number of pumping ports 45 of the structure of FIG. 8 is larger by one than that of the structure of FIG. 4B. The number of pumping ports and the flexibility for arrangement of hole position is advantageous to this invention. At the center of the multi-hole capillary having 10 holes, a single mode fiber having an MFD of about 4 μm (at the wavelength of 1.06 μm), an outer diameter of 125 μm, and a relative refractive index difference of 1% was used as an optical fiber for a signal port, and, at the periphery thereof, 9 MMFs having a core diameter of 110 μm and an outer diameter of 125 μm were used as a fiber for a pumping port. The outer diameter of the multi-hole capillary was about 730 μm and the diameter of the hole was 135 μm.

The resin-stripped sections of the optical fibers were inserted into the holes of the multi-hole capillary, and the fibers and the capillary were fused and unified by $CO_2$ laser while performing suction using a vacuum pump, thereby manufacturing a multi-core fiber.

Thereafter, the unified section was cut to form a cross section.

A bridge fiber having an MFD of about 5.5 μm (at the wavelength of 1.06 μm) and an outer diameter of 680 μm and the multi-core fiber were fusion spliced, and the bridge fiber was fused and elongated, thereby forming a tapered section. The outer diameter of the output side of the tapered section was 360 μm. Thereafter, the output side of the tapered section and one end of a double clad fiber for optical pumping having an MFD of 18 μm, an inner clad diameter of 400 μm and an outer diameter of 430 μm were fusion spliced, thereby manufacturing the optical pumping device.

At this time, in consideration of the matching with the NA of the inner clad section of the double clad fiber for optical pumping, which is a spliced fiber having the NA about 0.41, the NA of the output side of the tapered section was set to be less than 0.41 when the outer diameter of the output side of the tapered section was 360 μm in order to increase the coupling efficiency of the pumping light. In a device manufactured experimentally, the NA of the output side obtained was 0.32. With respect to signal light, the MFD was set to be substantially equal to 18 μm when the outer diameter of the output side of the tapered section was 360 μm to suppress the deterioration of the coupling efficiency due to the mismatch of the MFDs. In a device manufactured experimentally, the MFD of the output side of the tapered section obtained was about 14 μm.

The coupling loss of the pumping light of the obtained device was 0.3 dB in total and the coupling loss of the signal light was 1.3 dB.

Comparative Example 3

For the same purpose as Embodiment 3, the device of Comparative Example 1 may be used. In the structure of Patent Document 1, for example, even in a case where only 9 pumping ports can be used, an 18-port structure needs to be manufactured due to the limitation that the close-packed structure is required.

As a result, the outer diameter of the bundle of the input side increases (about 650 μm). Since the deformation of the pumping ports was large, the $NA_{out}$ of the manufactured device was resulted to be 0.46 and the coupling loss of pumping light was as large as 1.8 dB.

Embodiment 4

Figure 9:
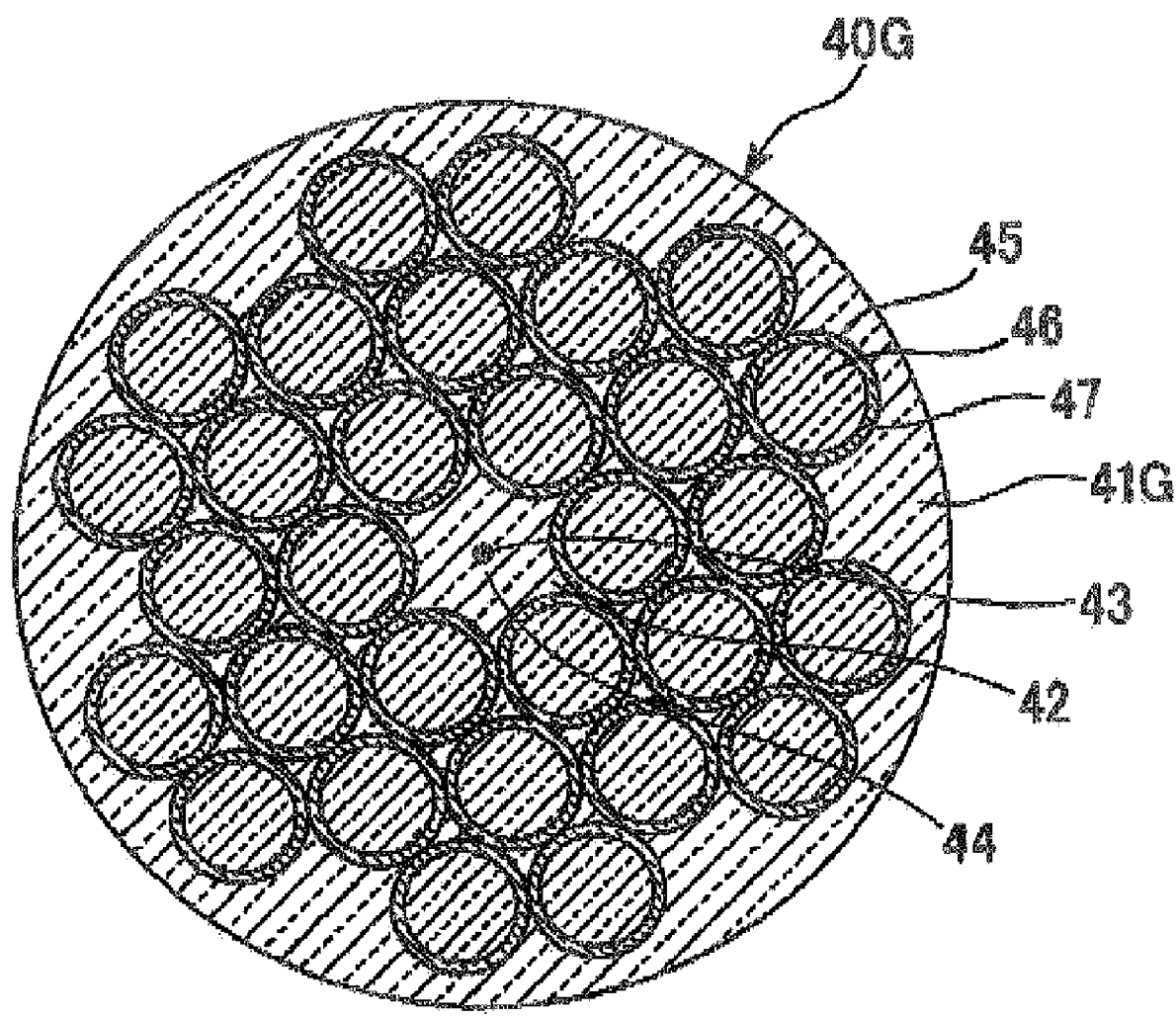
FIG. 9 is a cross-sectional view showing an example of arranging fibers in a multi-core fiber according to the present invention.

An optical pumping device having 30 pumping ports having the structure shown in FIG. 9 was manufactured.

The fibers or a manufacturing procedure was same as that of Embodiment 2 except that the outer diameter of the bridge fiber was 880 μm.

The coupling loss of the pumping light of the obtained device was 0.6 dB in total and the coupling loss of the signal light was 2.6 dB.

Comparative Example 4

With the method of Patent Document 1, for the same purpose as Embodiment 4, the device of Patent Document 1 may be used. In the structure of Patent Document 1, for example, even in a case where only 30 pumping ports can be used, a 36-port structure needs to be manufactured due to the limitation that the close-packed structure is required. In a device manufactured experimentally, the deformation of the pumping port was large, the coupling loss of the pumping light obtained was 5.6 dB, and the coupling loss of the signal light obtained was 11 dB. Accordingly, the device could not be practically used.

Embodiment 5

An optical pumping device having the structure shown in FIG. 4B was manufactured by the following procedure.

At the center of a multi-hole capillary for inserting 9 cores, a single mode fiber having an MFD of about 6 μm (at the wavelength of 1.06 μm), an outer diameter of 125 μm, and a relative refractive index difference of 0.45% was used as an optical fiber for a signal port, and, at the periphery thereof, 8 MMFs having a core diameter of 110 μm, an outer diameter of 125 μm and the NA of 0.23 were used as a fiber for a pumping port. The outer diameter of the multi-hole capillary was about 460 μm and the diameter of the fine hole was 140 μm.

The resin-stripped sections of the optical fibers were inserted into the holes of the multi-hole capillary, and the fibers and the capillary were fused and unified by flame, thereby manufacturing a multi-core fiber. Thereafter, the unified section was cut to form a cross section.

A bridge fiber having an MFD of about 5 μm (at the wavelength of 1.06 μm) and an outer diameter of 445 μm and the multi-core fiber were fusion spliced, and the bridge fiber was fused and elongated, thereby forming a tapered section. The outer diameter of the output side of the tapered section was 330 μM. Thereafter, the output side of the tapered section and one end of a double clad fiber for optical pumping having an MFD of 20 μm, an inner clad diameter of 400 μm and an outer diameter of 430 μm were fusion spliced, thereby manufacturing the optical pumping device.

At this time, in consideration of the matching with the NA of the inner clad section of the double clad fiber for optical pumping, which is a spliced fiber, having the NA of about 0.43 the NA of the output side of the tapered section was set to be less than 0.43 when the outer diameter of the output side of the tapered section was 330 μm in order to increase the coupling efficiency of the pumping light. In a device manufactured experimentally, the NA of the output side obtained was 0.31. With respect to signal light, the MFD was set to be substantially equal to 9 μm when the outer diameter of the output side of the tapered section was 330 μm to suppress the deterioration of the coupling efficiency due to the mismatch of the MFDs. In a device manufactured experimentally, the MFD of the output side of the tapered section obtained was about 7.8 μm.

The coupling loss of the pumping light of the obtained device was 0.15 dB in total and the coupling loss of the signal light was 1.4 dB.

While the invention has been particularly shown and described with reference to the exemplary embodiments thereof, the invention is not limited to the embodiments. The configuration may be added to, omitted, replaced and changed without departing from the spirit and scope of the invention. The scope of the invention is defined not by the above description but by the appended claims.

What is claimed is:

1. An optical pumping device comprising:
   a multi-core fiber comprising a bundle of a plurality of optical fibers, which are input ports;
   a double clad fiber for optical pumping; and
   a bridge fiber comprising a double clad fiber having a longitudinal tapered shape, wherein a first end of the bridge fiber is connected to the multi-core fiber and a second end of the bridge fiber is connected to the double clad fiber for optical pumping.

2. The optical pumping device according to claim 1, wherein the multi-core fiber comprises the plurality of optical fibers inserted into an alignment member in which gaps between the plurality of optical fibers are contracted, wherein an output side of the multi-core fiber is connected to the first end of the bridge fiber.

3. The optical pumping device according to claim 1, wherein the alignment member is a multi-hole capillary having a plurality of holes.

4. The optical pumping device according to claim 3, wherein the multi-hole capillary is made of silica glass.

5. The optical pumping device according to claim 1, wherein a product of a numerical aperture NA and an outer diameter of the multi-core fiber is less than that of a numerical aperture NA and an outer diameter of the double clad fiber for optical pumping.

6. The optical pumping device according to claim 5, wherein the numerical aperture NA of the multi-core fiber is 0.23 or less.

7. The optical pumping device according to claim 6, wherein the numerical aperture NA of the multi-core fiber is 0.15 or less.

8. The optical pumping device according to claim 5, wherein the outer diameter of the multi-core fiber is 1.2 mm or less.

9. The optical pumping device according to claim 8, wherein the outer diameter of the multi-core fiber is 750 μm or less.

10. The optical pumping device according to claim 5, wherein the numerical aperture NA of an output side of the pumping device is 0.46 or less.

11. The optical pumping device according to claim 10, wherein the numerical aperture NA of an output side of the pumping device is 0.43 or less.

12. The optical pumping device according to claim 5, wherein the outer diameter of an output side of the pumping device is 400 μm or less.

13. The optical pumping device according to any one of claims 3 to 5, wherein the number of holes of the multi-hole capillary is at least 8.

14. The optical pumping device according to claim 13, wherein the holes of the multi-hole capillary are not arranged in a close-packed structure.

15. The optical pumping device according to claim 1, wherein the multi-core fiber is fusion spliced to the first end of the bridge fiber and the second end of the bridge fiber is all splicing points arc fusion spliced to the double clad fiber for optical pumping.

16. An optical amplifier comprising the optical pumping device according to claim 1 and a pumping light source coupled to the input ports of the optical pumping device.

17. A fiber laser comprising the optical pumping device according to claim 1 and a pumping light source coupled to the input ports of the optical pumping device.

* * * * *